Patented Aug. 7, 1923.

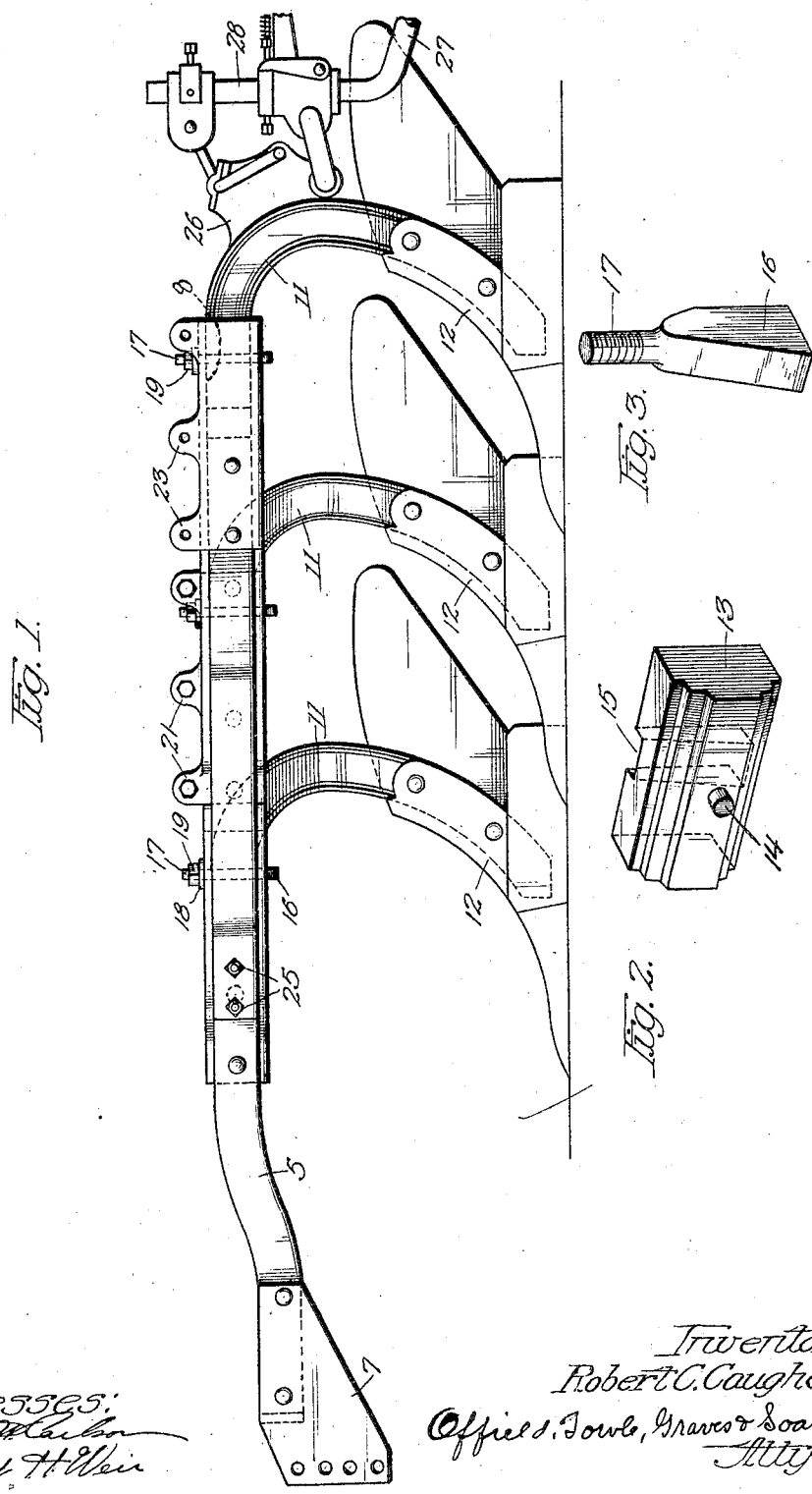

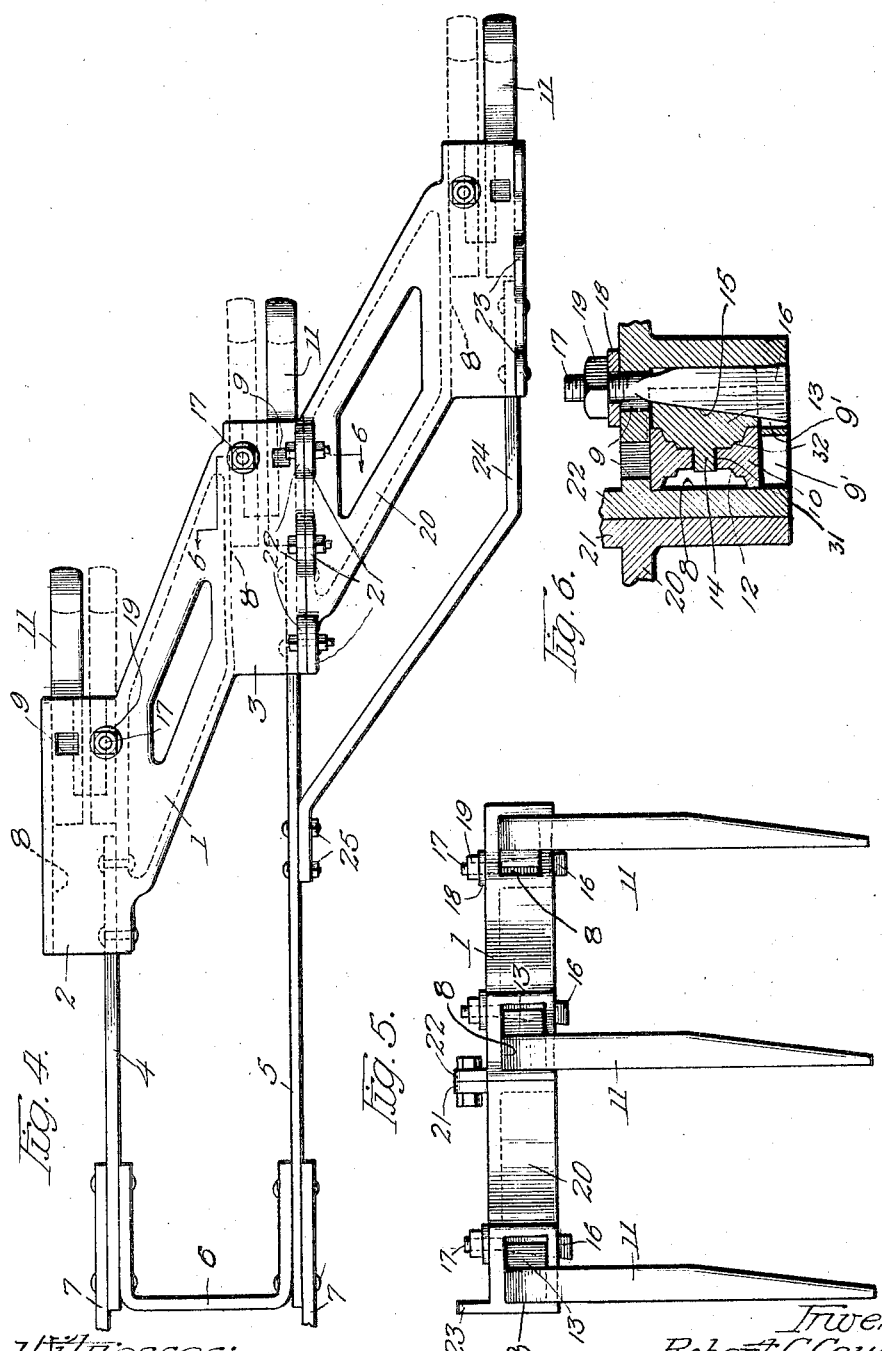

1,464,199

UNITED STATES PATENT OFFICE.

ROBERT C. CAUGHEY, OF DIXON, ILLINOIS, ASSIGNOR, BY MESNE ASSIGNMENTS, TO J. I. CASE THRESHING MACHINE COMPANY, OF RACINE, WISCONSIN, A CORPORATION OF WISCONSIN.

PLOWFRAME.

Application filed March 22, 1919. Serial No. 284,357.

*To all whom it may concern:*

Be it known that I, ROBERT C. CAUGHEY, a citizen of the United States, residing at Dixon, Lee County, State of Illinois, have invented certain new and useful Improvements in Plowframes, of which the following is a specification.

This invention relates to a plow in which there is a frame with means to provide for the substitution of different plow bodies therein, or the adjustment of plow bodies at different distances apart.

Among the objects of the invention are; to provide a frame in which separate plow bodies are interchangeably attachable; to provide means for variably spacing the bodies apart; to utilize the same frame for various plow widths; to accommodate different plow bodies on the same frame; to eliminate the trouble and delay caused when one of the plow standards is sprung or damaged while plowing; to provide a sectional frame to or from which sections can be added or subtracted; to insure that one of the plow standards will be sprung or broken instead of the main plow or frame; and in general, to provide the improved construction, combination and arrangement of parts as herein set forth.

In the accompanying drawing, Fig. 1 is a side elevation of a plow constructed in accordance with the principles of this invention;

Fig. 2 is a perspective of a wedge block;

Fig. 3 is a perspective of a wedge bolt;

Fig. 4 is a plan view of the structure shown in Fig. 1; with the castor wheel connections omitted.

Fig. 5 is a rear view of a plow of this kind; and

Fig. 6 is a sectional detail taken on the line 6—6 of Fig. 4.

Referring more particularly to the drawings, the numeral 1 designates, generally, a plow-frame section with staggered sections 2 and 3 formed integrally and preferably as a part of the same steel casting. Attached to the front ends of these staggered sections by any suitable fastening devices are stub plow beams 4 and 5, which are joined at their outer ends by a connector 6. Attached to each of the beams is a draft or clevis plate 7, commonly provided with a plurality of perforations for attachment to any suitable draft device.

Each of the staggered sections 2 and 3 is an elongated boxing with a preferably rectangular opening 8 extending lengthwise thereof and having a corresponding pair of holes 9 and 9' extending through the upper and lower walls thereof at each side of the opening 8, as shown more clearly in Fig. 6. These box sections are adapted to receive in the rectangular openings 8 thereof, any one of a number of beam ends 10, of standards 11, for supporting plow bodies 12, the beam ends 10 extending across approximately one-half of the transverse space of the box opening 8, and each beam is preferably formed with a perforation 31 and with a longitudinally extending shoulder portion 33 on each side of the opening, for receiving a correspondingly faced edge of a wedge block 13, which is also provided with a projection 14 adapted to extend into the perforation 31. At the opposite side of this wedge block 13 it is formed with a wedge slot 15 in which a wedge bolt 16 is adapted to be seated, the wedge bolt being inserted up through the perforation 9', and formed with a threaded extremity 17 which extends loosely through one of the openings 9 in the frame plate 1, where a washer 18 surrounds it with a nut mounted on the threaded portion, for drawing the wedge bolt upwardly and securely clamping the wedge block 13 and the beam standard 10 in place. With this construction it is obvious that the beam 10 could be disposed at the other side of the channel or recess 8, (see Fig. 6), by transferring the wedging block and bolt to the other side of the beam 10, whereupon the wedging bolt would extend through the openings 9 and 9' at the other side of the recess. In this way a certain adjustment is possible depending upon the sizes of the various parts, and for convenience it may be taken as a difference of two inches, so that the movement of the plow beam or standard to one side or the other of the recess 8 will vary the transverse position two inches. It is obvious that this adjustment may be utilized for employing plow bodies of various widths in the same frame, for example in the construction shown, assuming that the inner-most plow beam centers of the frame 1 are ten inches apart, the adjustment of one of the plow beams to the outer center will place the beams a transverse distance of twelve inches apart, and if both of the beams are moved to their outer centers they will be spaced apart fourteen inches. Of course these distances can be varied as desired.

Attachable to the main plow frame casting 1 is a supplementary casting 20 which is preferably formed with lateral connection ears 21, by means of which it is attached to corresponding connection ears 22 formed at one side of the frame casting 1. At the other side of this supplemental frame 20 are other attachment ears 23 by means of which any number of sections 20 may be attached in succession. Extending from the outer side of this attachable extension 20 is a brace 24 which is attached by means of fastening bolts 25 to one of the stub beams 5. This supplemental frame 20 is formed with a single recess 8 for receiving and attaching the plow standard beams, and in the form shown, with only two adjustments in the frame section 20 it is possible to vary the three plow standards on either a 12 or 14 inch width, as shown more clearly by Fig. 5, for by leaving the middle standard in the central position, as shown, and having the two outer standards in their outermost positions, the standards will be at their greatest possible distance apart, and if they are both moved inwardly they will be at the lesser distance. With this construction it is obvious that either 12 inch or 14 inch plows can be used in connection with the standards.

It will be apparent that the plow bodies which can be used with a plow frame of this kind may be varied in character; for example either stubble or braker bottoms may be used, or bodies of different widths may be used, or the same plow as a whole may be easily changed to a two or three bottom implement by simply adding or removing the plow bodies by means of the wedging bolts and blocks. With this construction any one of the plow bodies can be separately removed and another one substituted, so that if one standard becomes sprung or damaged in any way it can be removed and a new one substituted. By having a plurality of sections the plow can be varied to cut as many furrows as desired, and by varying the width of the sections the distance between the furrows can also be varied at will. This sectional frame structure readily lends itself to various changes and combinations because of its adjustability. It is also easily manufactured and shipped because of the few parts and the facility with which they are assembled and the small space which they occupy when the parts are taken apart; it reduces the cost to the manufacturer, the dealer, and the user because each implement is capable of different combinations, and because it reduces the number of complete implements which any one of them need keep in stock to accomplish all of the desired results.

If desired, a castor wheel may be attached to one of the plow standards, and this standard is connected at the rear inside end of the plow frame so that the wheel will travel in the inside furrow. This castor wheel may be attached in any convenient manner, but for the purpose of illustration I have shown a portion of structure such as shown in my application filed January 13, 1919, Serial No. 270,774, to which reference may be had for a complete understanding of this attachment.

As shown, this castor wheel connection comprises a bracket 26, secured to the rear of the plow standard 11, and a bent axle 27 has the upright portion 28 thereof connected to the bracket to support the axle. The castor wheel (not shown) is journaled to the rear end of the axle 27 in any suitable manner so as to travel behind the plow in the furrow.

When a three-body plow is to be changed to a two-body plow, it is necessary only to remove the middle standard and then take the rear standard out with the plow bottom attached and insert it in the middle opening. The frame section 20 does not have to be removed as it is not in the way of the successful working of the plow. By this it will be seen a three-plow can be changed to a two-plow, or vice versa, by simply removing two wedge bolts and replacing one.

The detailed construction which I have shown and described is merely an illustrative embodiment of my invention, the scope of which is to be determined by reference to the appended claims.

I claim:

1. A plow comprising a frame with a socket, a plow body having a supporting beam which extends forwardly into the socket and is adapted to be optionally positioned at opposite sides of the socket, and means for applying pressure at either side of the beam to clamp the beam against either side of the socket.

2. In a plow, a plurality of separable sections forming a frame of variable length extending transversely of the line of draft, a plurality of plow-bodies, each of which has a separate supporting standard, a socket on each of said sections for the standards, said sockets being wider than the standards to afford optional spacing of the plow-bodies, and means for selectively binding the standards in different positions in the sockets coresponding to the optional spacing of the plows.

3. The combination with a draft frame having a plow beam receiving recess open at the rear, a plow-body, with an individual beam extending forwardly into the recess, a wedging block to engage the inserted beam, and a wedging belt having a fastening nut and adapted to tighten the block against the beam in the recess and hold them both in place therein.

4. A plow frame having a rectangular recess opening rearwardly at the rear thereof with spaced openings through the frame above the recess, a plow-body with a standard insertable loosely in the recess and having a transverse perforation and longitudinally extending shouldered edges at both sides of the inserted portion, a clamping block having a corresponding shouldered surface and a projection to register with the perforations, and a wedging bolt abutting the opposite side of the block and extending through one of the frame openings with fastening means for drawing it up tightly.

5. In an implement of the class described, the combination of a plow supporting frame having laterally spaced elongated sockets extending in the direction of the line of draft, a plurality of plow bodies, each having a plow beam extending upwardly and forwardly and having the forward end inserted in one of the sockets and independently operable means for each socket for clamping the plow beam in the socket.

6. In an implement of the class described, the combination of a plow supporting frame comprising sections detachably connected together side by side to form a frame of variable length extending transversely to the line of draft, a socket in each section adapted to embrace the end of a plow beam and means in the socket for detachably clamping the end of the plow beam in the socket.

7. In an implement of the class described, the combination of a frame having laterally spaced sockets adapted to have the forward end of a plow beam inserted in the rear end thereof, having interlocking engagement with the plow beam in a predetermined inserted position, and a wedge for securing the plow beam in the socket in the interlocked position.

8. In an implement of the class described, the combination of a plow supporting frame having a plurality of sockets adapted to embrace the forward end of a plow beam, a plurality of plow beams, each having a plow secured thereto, a trailer wheel mounted at the rear end of one of the low beams, a corresponding member in each socket adapted to interlock with the plow beam and means for detachably clamping the plow beam optionally in the sockets.

9. In an implement of the class described, the combination of a socket, a plow beam adapted to be inserted in the socket, a pin adapted to engage an aperture in the plow beam and a wedge for clamping the plow beam in the socket and cooperating with the pin to hold the beam in place in the socket.

10. In an implement of the class described, the combination of a plow frame having a socket, a plow beam adapted to be inserted in the socket, a clamping block operable laterally against the side of the plow beam and having a keyway in the side thereof, and a wedge member slidable in the keyway of the block and having a wedge action therebetween for operating the clamping block to clamp the plow beam in the socket.

ROBERT C. CAUGHEY.